(12) United States Patent
Kim (10) Patent No.: US 7,215,325 B2
(45) Date of Patent: May 8, 2007

(54) POINT INPUTTING DEVICE AND METHOD FOR THREE-DIMENSIONAL IMAGES

(75) Inventor: Han-Joon Kim, Kobe (JP)

(73) Assignee: Imagnosis Inc., Hyogo (JP)

( * ) Notice: Subject to any disclaimer, the term of this patent is extended or adjusted under 35 U.S.C. 154(b) by 155 days.

(21) Appl. No.: 10/296,717

(22) PCT Filed: Jun. 18, 2001

(86) PCT No.: PCT/JP01/05167

§ 371 (c)(1),
(2), (4) Date: Nov. 26, 2002

(87) PCT Pub. No.: WO01/19174

PCT Pub. Date: Dec. 20, 2001

(65) Prior Publication Data

US 2003/0132933 A1    Jul. 17, 2003

(30) Foreign Application Priority Data

Jun. 16, 2000  (JP)  ............................. 2000-182069

(51) Int. Cl.
*G09G 5/08* (2006.01)
(52) U.S. Cl. ...................... 345/158; 345/653; 345/156; 345/158
(58) Field of Classification Search ................ 345/653, 345/156, 157, 158
See application file for complete search history.

(56) References Cited

U.S. PATENT DOCUMENTS 5,602,564 A  2/1997  Iwamura et al.
6,052,100 A  *  4/2000  Soltan et al. ................... 345/6
6,273,896 B1 *  8/2001  Franck et al. ................ 606/130
6,546,277 B1 *  4/2003  Franck et al. ................ 600/426

FOREIGN PATENT DOCUMENTS

| JP | 1-98084 | 4/1989 |
| JP | 3-231643 | 10/1991 |
| JP | 6-337920 | 12/1994 |
| JP | 09-016814 | 1/1997 |
| JP | 11-9590 | 1/1999 |
| JP | 11-86039 | 3/1999 |
| JP | 2000-268204 | 9/2000 |

* cited by examiner

Primary Examiner—Kee M. Tung
Assistant Examiner—Tam Tran
(74) Attorney, Agent, or Firm—Rabin & Berdo, P.C.

(57) ABSTRACT

Where an arbitrary point on an image is designated in the field of a medical image, it is generally designated on a sectional image, and an arbitrary point on a three-dimensional image cannot be designated. According to the invention the orientation of the three-dimensional image is controlled in a first direction corresponding to the operation of the user. When an arbitrary point of the three-dimensional image is designated by the user, a plane passing through that point and normal to a display screen is created and stored. Next, the three-dimensional image is oriented in a second direction, and an arbitrary point is designated in the second direction by the user. Then, there is created a straight line which passes through that point and which is normal to the display screen. Then, the coordinates of the intersection the stored screen and the straight line are determined, and the point having the coordinates of the intersection point is displayed on the three-dimensional image. As a result, an arbitrary point on the three-dimensional image can be designated by a simple operation.

12 Claims, 8 Drawing Sheets

POINT INPUTTING DEVICE AND METHOD FOR THREE-DIMENSIONAL IMAGES

TECHNICAL FIELD

The present invention relates to a device and method for designating and inputting an arbitrary point on a three-dimensional image displayed on a display screen. More particularly, the invention relates to a device and method for inputting an arbitrary point designated on a three-dimensional image for use in the filed of medical images.

PRIOR ART

In the field of medical images, processing of images three-dimensionally rendered from tomographic images such as of MRI or CT is widely utilized. Medical three-dimensional image rendering methods are broadly classified into two categories: a surface rendering method and a volume rendering method. In the surface rendering method, the contour or surface configuration of an object to be displayed is rendered (by surface patches or tiles typified by triangular patches on an algorithmic basis). In the volume rendering method, an opacity level or color information is assigned to each of voxels constituting a three-dimensional object on the basis of a ray casting algorithm for visualization of the inside of the object. Where an image three-dimensionally rendered by either of these methods is employed in a clinical field, it is necessary to pick (designate or specify) an arbitrary point (or position) on the three-dimensional image in order to perform an image processing operation such as a measuring, marking or extracting operation on the rendered image.

In the surface rendering method, the contour is extracted, so that a point on the displayed contour can be picked. However, it is impossible to pick an internal portion overlapping with other structure.

In the volume rendering method, on the other hand, it is impossible to directly pick an arbitrary point on the three-dimensional image, because information on an internal portion alone is present.

Therefore, it is a conventional practice to designate an arbitrary point on tomographic images (on a plurality of views, e.g., front, top and side views) rather than on a three-dimensionally rendered image (as described above, it is possible to directly pick an arbitrary point on the three-dimensional image but only on the contour in the surface rendering method). Therefore, the designation of the arbitrary point on the image requires a great number of processing operations, and is complicated and time-consuming.

DISCLOSURE OF THE INVENTION

In view of the foregoing, it is a main object of the present invention to provide a point inputting device and method which is capable of designating an arbitrary point on a three-dimensional image by a simple operation.

It is another object of the present invention to provide a point inputting device and method which is capable of designating an arbitrary point on a three-dimensional image irrespective of a three-dimensional rendering method (a surface rendering method or a volume rendering method) by a simple processing operation in a shorter processing time.

In accordance with an inventive aspect as set forth in claim 1, there is provided a point inputting device for a three-dimensional image, the device comprising: display means for displaying the three-dimensional image on a display screen; display controlling means for controlling an orientation of the three-dimensional image displayed on the display screen into a desired orientation; means operative in response to designation of an arbitrary point on the three-dimensional image displayed in a first orientation on the display screen for creating a plane passing through this point orthogonally to the display screen; means operative in response to designation of an arbitrary point on the three-dimensional image displayed in a second orientation different from the first orientation on the display screen for creating a straight line passing through this point orthogonally to the display surface; and means for determining coordinates of an intersection between the created plane and the created straight line, and retaining the intersection as a pick point.

In accordance with an inventive aspect as set forth in claim 2, the three-dimensional image point inputting device set forth in claim 1 further comprises pick point associated processing means for displaying the pick point on the three-dimensional image, displaying a data value of the pick point, or extracting a region around the pick point.

In accordance with an inventive aspect as set forth in claim 3, there is provided a three-dimensional image arbitrary point inputting method for designating an arbitrary point on a three-dimensional image displayed on a display screen, the method comprising the steps of: controlling an orientation of the three-dimensional image displayed on the display screen into a first orientation according to an operation of a user and, in response to designation of an arbitrary point on the three-dimensional image displayed in the first orientation on the display screen by the user, creating a plane passing through this point orthogonally to the display screen; controlling the orientation of the three-dimensional image displayed on the display screen into a second orientation different from the first orientation according to an operation of the user; in response to designation of an arbitrary point on the three-dimensional image displayed in the second orientation on the display screen by the user, creating a straight line passing through this point orthogonally to the display screen; and determining coordinates of an intersection between the created plane and the created straight line and retaining the intersection as a pick point.

In accordance with an inventive aspect as set forth in claim 4, there is provided a three-dimensional image point inputting device for a three-dimensional image, the device comprising: display means for displaying the three-dimensional image on a display screen; display controlling means for controlling an orientation of the three-dimensional image displayed on the display screen into a desired orientation; means operative in response to designation of an arbitrary point on the three-dimensional image displayed in a first orientation on the display screen, creating two planes each passing through this point orthogonally to the display screen; means operative in response to designation of an arbitrary point on the three-dimensional image displayed in a second orientation different from the first orientation on the display screen, creating one plane passing through this point orthogonally to the display screen; and means for determining coordinates of an intersection between the stored three planes, and retaining the intersection as a pick point.

In accordance with an inventive aspect as set forth in claim 5, there is provided a three-dimensional image arbitrary point inputting method for designating an arbitrary point on a three-dimensional image displayed on a display screen, the method comprising the steps of:

① controlling an orientation of the three-dimensional image displayed on the display screen into a first orientation according to an operation of a user and, in response to designation of an arbitrary point on the three-dimensional image displayed in the first orientation on the display screen by the user, creating two planes or one straight line passing through this point orthogonally to the display screen;

② controlling the orientation of the three-dimensional image displayed on the display screen into a second orientation different from the first orientation according to an operation of the user and, in response to designation of an arbitrary point on the three-dimensional image displayed in the second orientation on the display screen by the user, creating one plane passing through this point orthogonally to the display screen;

③ determining coordinates of an intersection between the three planes including the two planes created in the step ① and the one plane created in the step ② or determining coordinates of an intersection between the straight line created in the step ① and the one plane created in the step ②; and ④ retaining the intersection represented by the determined coordinates as a pick point.

In accordance with an inventive aspect as set forth in claim 6, the step ② precedes the step ① in the three-dimensional image arbitrary point inputting method set forth in claim 5.

In accordance with an inventive aspect as set forth in claim 7, there is provided a program for designating an arbitrary point on a three-dimensional image displayed on a display screen, the program performing the steps of:

① controlling an orientation of the three-dimensional image displayed on the display screen into a first orientation according to an operation of a user and, in response to designation of an arbitrary point on the three-dimensional image displayed in the first orientation on the display screen by the user, creating two planes or one straight line passing through this point orthogonally to the display screen;

② controlling the orientation of the three-dimensional image displayed on the display screen into a second orientation different from the first orientation according to an operation of the user and, in response to designation of an arbitrary point on the three-dimensional image displayed in the second orientation on the display screen by the user, creating one plane passing through this point orthogonally to the display screen;

③ determining coordinates of an intersection between the three planes including the two planes created in the step ① and the one plane created in the step ② or determining coordinates of an intersection between the straight line created in the step ① and the one plane created in the step ②; and ④ retaining the intersection represented by the determined coordinates as a pick point.

In accordance with an inventive aspect as set forth in claim 8, there is provided a three-dimensional image arbitrary point inputting method for designating an arbitrary point on a three-dimensional image displayed on a display screen, the method comprising the steps of: controlling an orientation of the three-dimensional image displayed on the display screen into a first orientation according to an operation of the user and, in response to designation of an arbitrary point on the three-dimensional image displayed in the first orientation on the display screen by the user, creating a sectional image passing through this point orthogonally to the display screen; displaying the created sectional image on the display screen; in response to designation of an arbitrary point on the sectional image displayed on the display screen, storing coordinates of this point; and converting the stored coordinates of the point on the sectional image into three-dimensional coordinates and retaining the three-dimensional coordinates.

According to the inventive aspects of claims 1 to 7, the user can designate the arbitrary points on the three-dimensional image displayed on the display screen while viewing the three-dimensional image. Thus, the designation of the arbitrary points on the three-dimensional image can be achieved by viewing the three-dimensional image displayed in the first orientation and the three-dimensional image displayed in the second orientation. Thus, a desired point can easily be specified.

In the point inputting devices and the point inputting methods according to the present invention, the coordinates of the intersection between the plane passing through the point firstly designated on the three-dimensional image orthogonally to the display screen and the straight line passing through the point secondly designated on the display screen orthogonally to the display screen are determined to specify the pick point on the three-dimensional image. Therefore, the single pick point can accurately be specified.

In the pick point specifying method according to the present invention, the single pick point can be specified on the basis of the coordinates of the intersection between the three planes including the two planes passing through the point designated on the three-dimensional image displayed in the first orientation orthogonally to the display screen and the one plane passing through the point designated on the three-dimensional image displayed in the second orientation orthogonally to the display screen, as described in claim 4, rather than on the basis of the intersection between the plane and the straight line.

What is important for the specification of the pick point is that the pick point is specified on the basis of the intersection between the three planes or the intersection between the one plane and the straight line. Therefore, the three-dimensional image may first be displayed in the second orientation for the creation of the straight line or the one plane, and then displayed in the first orientation for the creation of the one plane or the two planes. Thus, the order for the creation of the planes and the straight line is not particularly limited.

According to the inventive aspect of claim 2, various processing operations can be performed on the region around the designated pick point in association with the pick point.

According to the inventive aspect of claim 8, the arbitrary point can accurately be designated on the three-dimensional image by a simple operation.

DESCRIPTION OF THE PREFERRED EMBODIMENTS

One embodiment of the present invention will hereinafter be described specifically with reference to the drawings.

Figure 1:
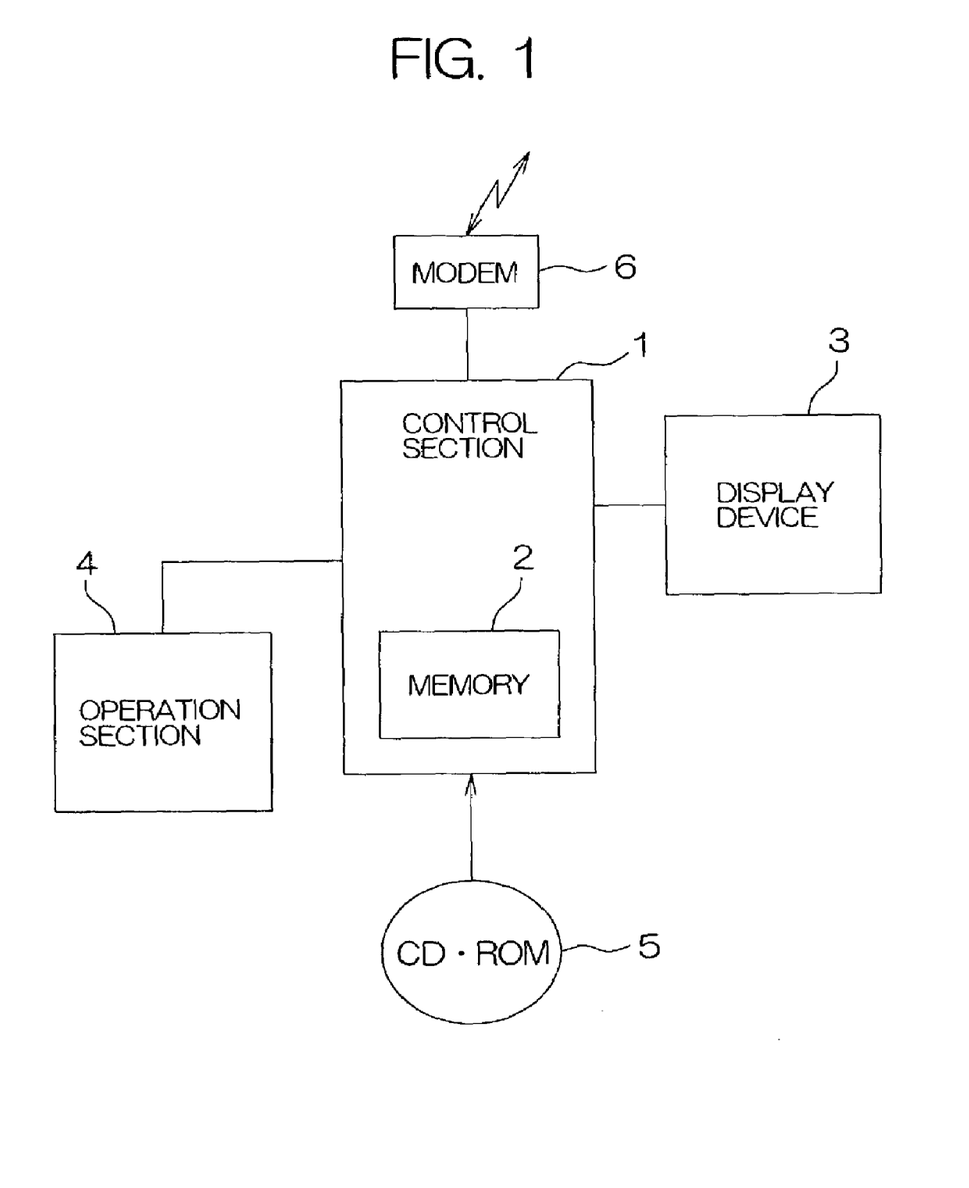
FIG. 1 is a block diagram illustrating the hardware configuration of a point inputting device for three-dimensional images according to one embodiment of the present invention.

FIG. 1 is a block diagram illustrating the hardware configuration of a point inputting device for three-dimensional images according to the embodiment of the present invention. The device has a control section 1 including a microprocessor and the like. The control section 1 further includes a memory 2 for storing therein operation programs and various data. The control section 1 is connected to a display device 3 for displaying a three-dimensional image. The display device 3 may be a cathode ray tube display, a liquid crystal display or the like. The control section 1 is further connected to an operation section 4. The operation section 4 includes input devices such as a key board and a mouse for inputting a signal and data.

The control section 1 reads information recorded in an information recording medium 5 such as a CD-ROM or an optical disk, and stores the read information in the memory 2 as required. The control section 1 is further connected to a communication modem 6. Through the communication modem 6, necessary information and data can be taken in from an information network, and predetermined data can be transmitted to the information network.

The point inputting device according to this embodiment features that a user is permitted to designate a desired point on a three-dimensional image displayed on a display screen of the display device 3, and the designated point is stored and displayed in relation to the three-dimensional image.

Such an operation is performed in accordance with a program executed by the control section 1 as will be explained below. Further, the present invention features a method to be performed according to the program for designating an arbitrary point on the three-dimensional image.

The program embodying the present invention may preliminarily be stored in the memory 2 of the control section 1 or recorded in the information recording medium 5. The program recorded in the information recording medium 5 is installed in the control section 1 and stored in the memory 2 of the control section 1. The program according to the present invention may be downloaded in the control section 1 from an external information network via the modem 6.

A more specific explanation will hereinafter be given to operations to be performed by the control section 1, i.e., the feature of the program according to this embodiment.

The control section 1 is capable of installing the program recorded in the information recording medium 5 or the program received via the modem 6 in the memory 2, and taking in and storing tomographic image data captured by MRI or CT in the memory 2. The tomographic image data may also be acquired from data recorded in the information recorded medium 5 or transmitted via the modem 6. The tomographic image data is applied to the control section 1 so as to be rendered into a medical three-dimensional image in the control section 1. Alternatively, medical three-dimensional image data per se may be applied to the control section 1.

Figure 2:
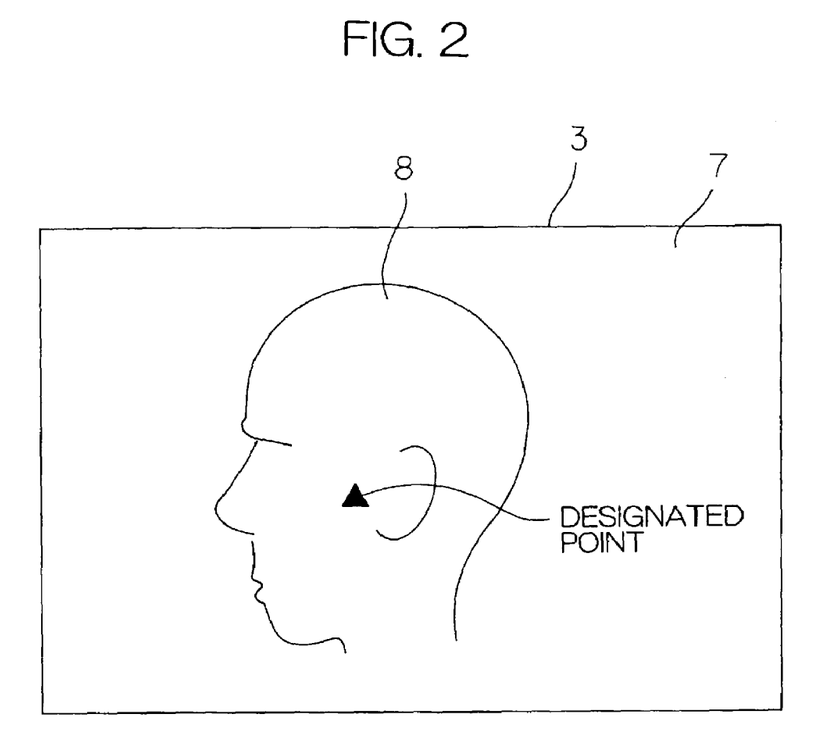
FIG. 2 is a diagram illustrating an exemplary three-dimensional image displayed on a display screen of a display device.

FIG. 2 is a diagram illustrating an exemplary three-dimensional image 8 displayed on the display screen 7 of the display device 3. The three-dimensional image 8 is an image three-dimensionally rendered from tomographic images such as of MRI or CT and applied to the control section 1, or an image displayed on the basis of the three-dimensional image data applied to the control section 1. The user operates the operation section 4 to rotate the three-dimensional image 8 displayed on the display screen 7 into a desired orientation, enlarge a desired portion of the three-dimensional image, or display a section of a desired portion of the three-dimensional image.

In this embodiment, the three-dimensional image 8 displayed on the display screen 7 can be manipulated into a desired orientation, and an arbitrary point can be designated on the three-dimensional image 8. The designation of the point can be achieved by placing a cursor on a desired portion of the three-dimensional image 8 with the use of the mouse, and clicking the mouse.

In response to the designation of the arbitrary point on the three-dimensional image 8, the control section 1 creates, for example, a horizontal plane passing through the designated point orthogonally to the display screen 7, and stores the horizontal plane.

Figure 3:
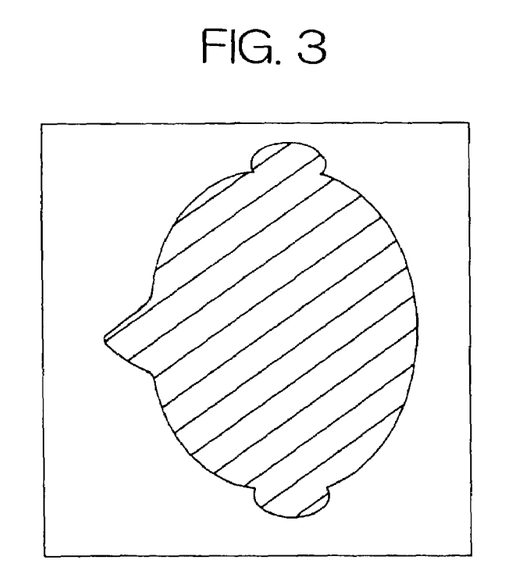
FIG. 3 is a diagram illustrating a created plane (horizontal plane)

FIG. 3 is a diagram illustrating the horizontal plane thus created and stored. The horizontal plane shown in FIG. 3 is merely created in the control section 1 and stored in the memory 2, but not necessarily required to be displayed on the display device 3.

Figure 4:
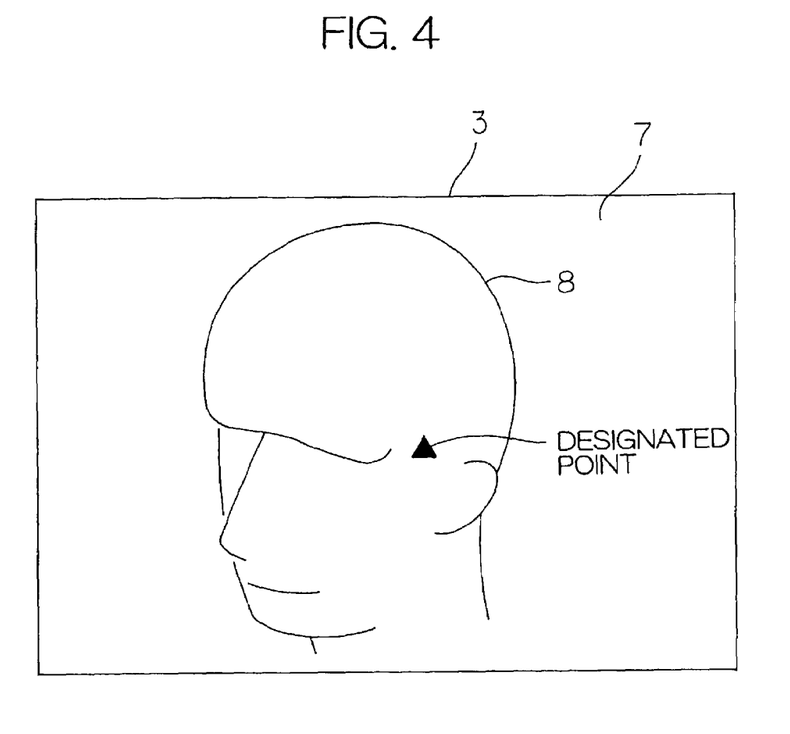
FIG. 4 is a diagram illustrating the three-dimensional image of FIG. 2 as seen from another viewpoint by way of example.

The user next manipulates the three-dimensional image 8 displayed on the display screen 7 of the display device 3 into an orientation different from the orientation shown in FIG. 2. For example, the three-dimensional image is oriented as shown in FIG. 4. When the user designates the arbitrary point on the three-dimensional image, it is merely necessary to set the orientation of the three-dimensional image 8 shown in FIG. 2 or the orientation of the three-dimensional image 8 shown in FIG. 4 so as to ensure that the point is visible.

The user designates a desired point on the three-dimensional image 8 shown in FIG. 4. The designation of the point can be achieved in the same manner as described above with the use of the mouse.

After the user designates the arbitrary point on the three-dimensional image 8 shown in FIG. 4, the control section 1 creates a straight line passing through the designated point orthogonally to the display screen 7, and stores the straight line. It is not necessary to display the straight line thus created on the display device 3.

Figure 5:
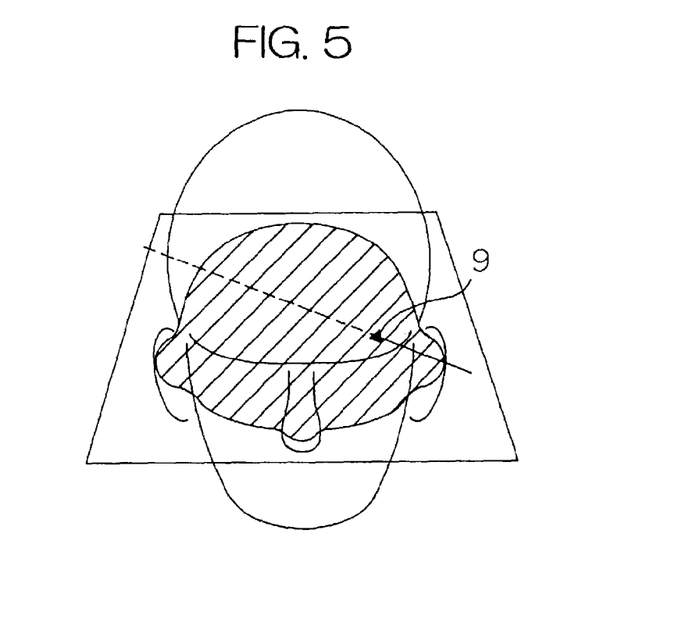
FIG. 5 is a diagram illustrating a pick point displayed on the three-dimensional image by way of example.

Then, the control section 1 determines coordinates of an intersection between the horizontal plane created and stored on the basis of the display shown in FIG. 2 and the straight line created on the basis of the display shown in FIG. 4, and display the intersection represented by the coordinates as a pick point on the three-dimensional image. For example, the pick point 9 is displayed as shown in FIG. 5.

Through the aforesaid process, the user can directly designate the arbitrary points on the three-dimensional image 8 while viewing the three-dimensional image. In addition, the specification of the pick point is based on the three-dimensional image displayed in the first orientation on the display screen 7 and the three-dimensional image displayed in the second orientation. Therefore, the pick point can easily and assuredly be specified.

An explanation will be given to another exemplary process to be performed in this embodiment.

Figure 6:
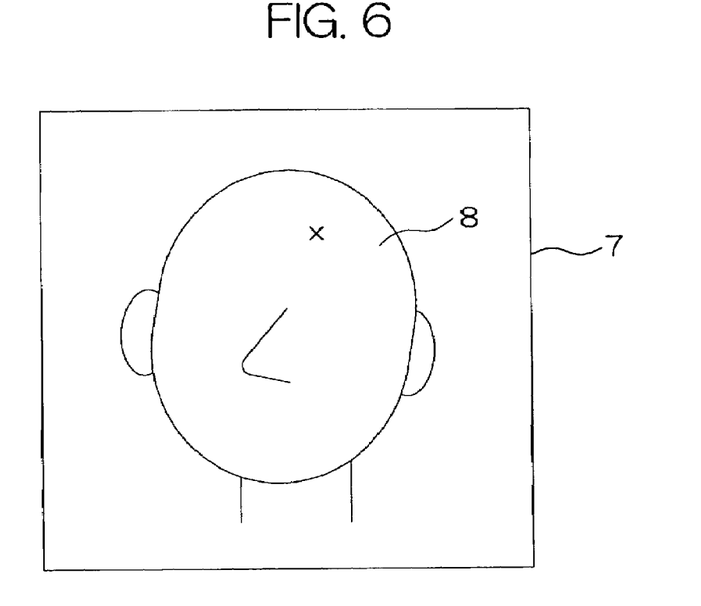
FIG. 6 is a diagram illustrating another exemplary three-dimensional image displayed on the display screen of the display device.

The user displays the three-dimensional image 8 in an arbitrary orientation on the display screen 7 of the display device 3 as shown in FIG. 6, and designates a desired point on the three-dimensional image. The designated point is denoted by a symbol X.

In response to the designation of the point, a vertical section passing through the designated point orthogonally to the display screen 7 is created. The vertical section thus created is shown in FIG. 7.

Figure 8:
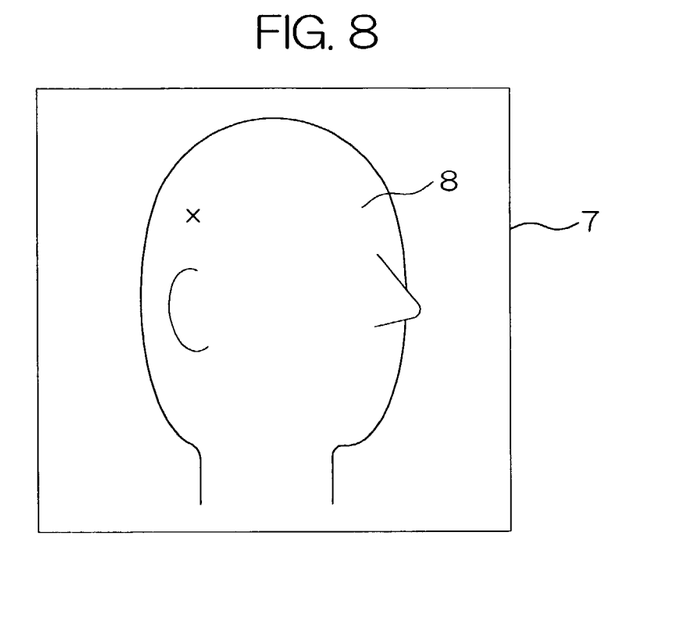
FIG. 8 is a diagram illustrating the three-dimensional image of FIG. 6 as seen from another viewpoint by way of example.

The user rotates and moves the three-dimensional image of FIG. 6 displayed on the display screen 7, for example, into an orientation shown in FIG. 8, and designates a desired point (indicated by a symbol X and also appearing in FIG. 6) on the three-dimensional image 8 of FIG. 8.

A straight line passing through the point designated as shown in FIG. 8 orthogonally to the display screen 7 is created and stored.

Figure 7:
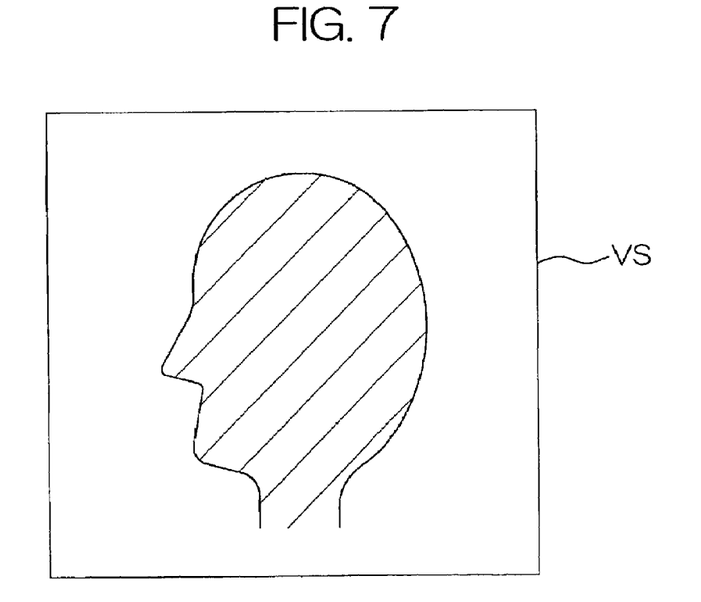
FIG. 7 is a diagram illustrating a created plane (vertical sectional plane)
Figure 9:
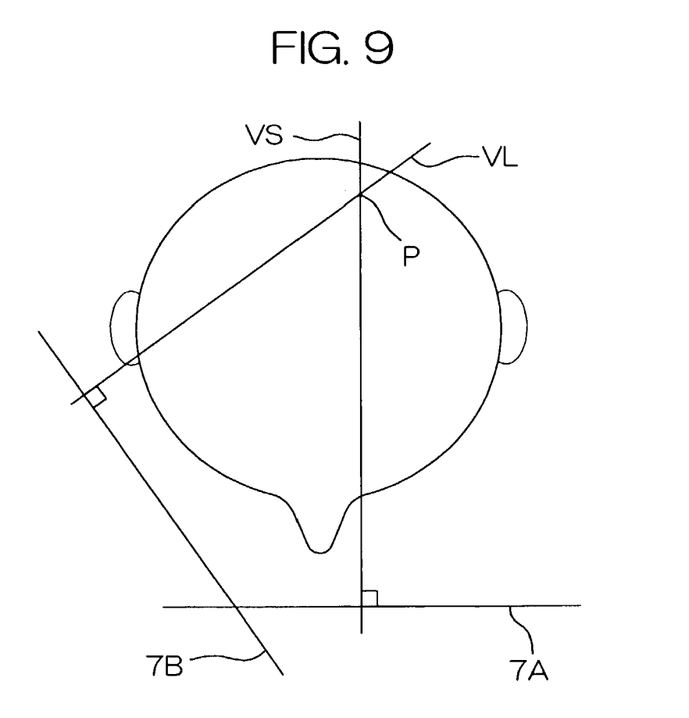
FIG. 9 is an explanatory diagram illustrating, in plan, a process performed as shown in FIGS. 6 to 8.

FIG. 9 is an explanatory diagram illustrating, in plan, the process performed as shown in FIGS. 6 to 8. A reference character 7A in FIG. 9 corresponds to the display screen 7 in FIG. 6, and a reference character 7B corresponds to the display screen 7 in FIG. 8. The created vertical section orthogonal to the display screen 7 as shown in FIG. 7 is denoted by a reference character VS in FIG. 9. On the other hand, the straight line passing through the point designated in FIG. 8 orthogonally to the display screen 7B is denoted by a reference character VL in FIG. 9. The coordinates of the intersection between the plane VS and the straight line VL are determined, which represent the pick point P specified on the three-dimensional image.

Thus, the arbitrary pick point on the three-dimensional image can accurately be specified by a simple operation.

Figure 10:
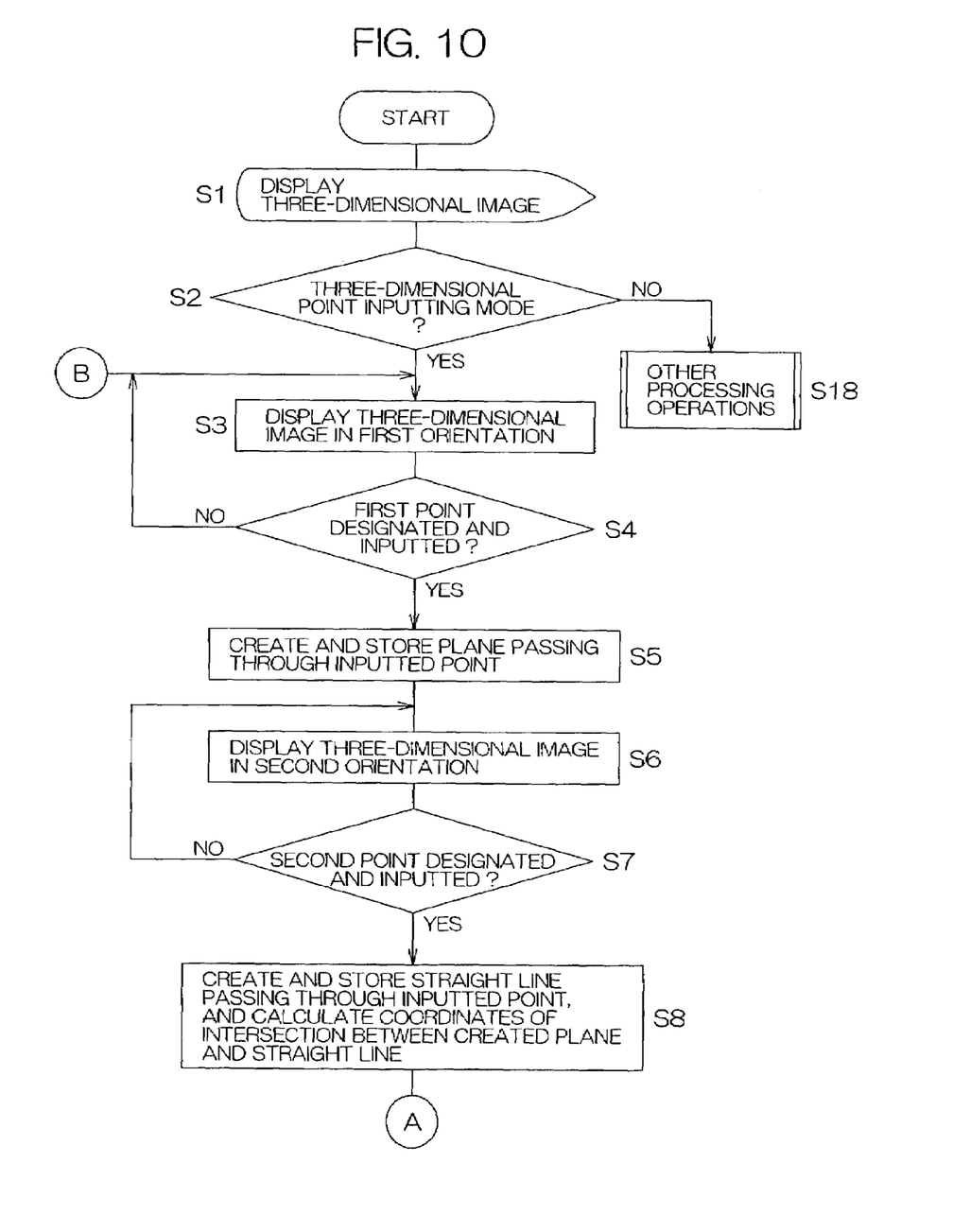
FIG. 10 is a flow chart illustrating processing operations to be performed by a control section.
Figure 11:
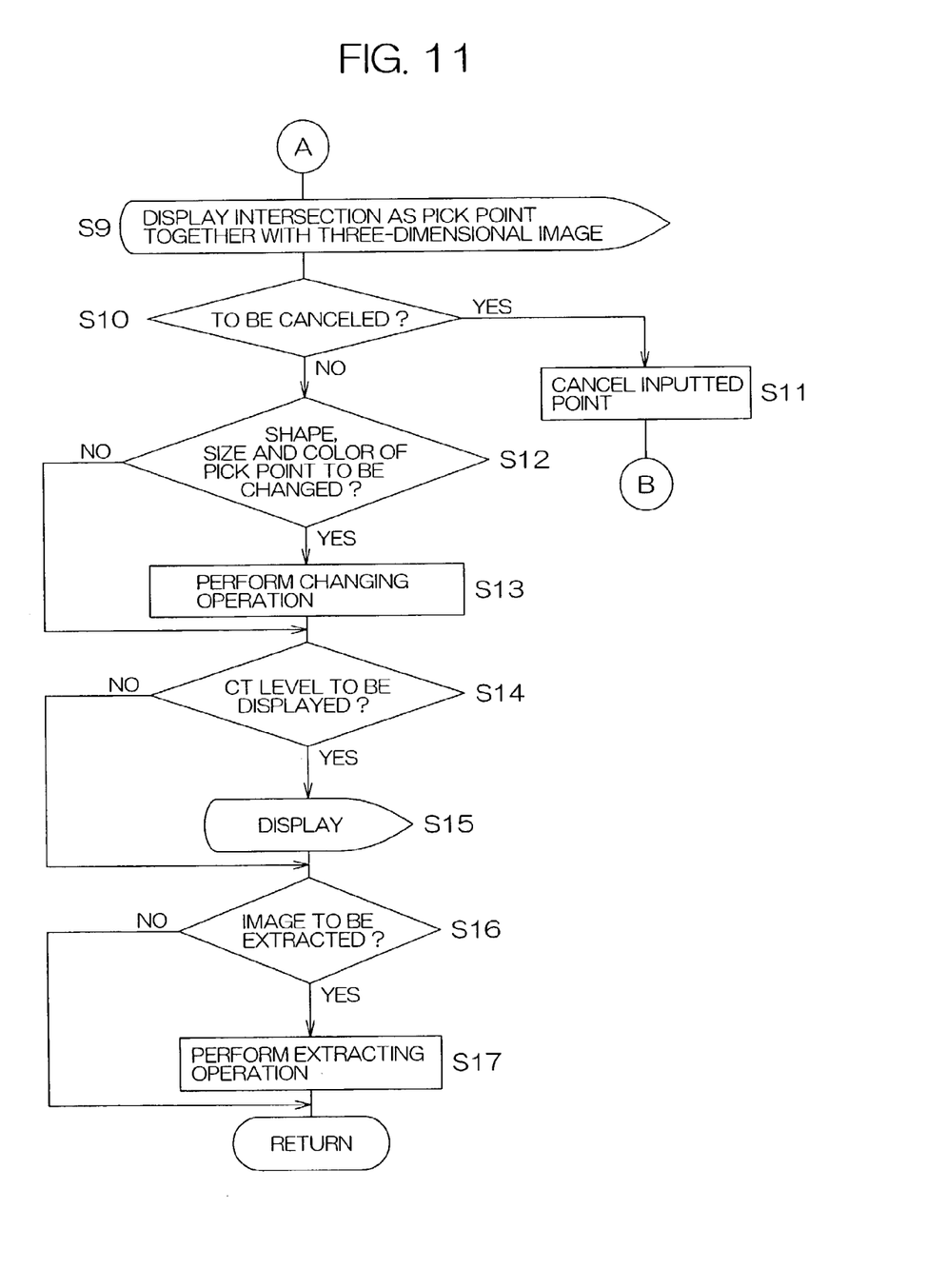
FIG. 11 is a flow chart illustrating processing operations to be performed by the control section.

FIGS. 10 and 11 are flow charts illustrating processing operations to be performed by the control section 1 shown in FIG. 1. With reference to FIGS. 1 to 9, an explanation will be given to the flow of the operations shown in FIGS. 10 and 11.

First, a three-dimensional image is displayed on the display device 3 (Step S1). The displayed three-dimensional image is an image three-dimensionally rendered from tomographic images such as of MRI or CT. A program for the three-dimensional rendering is preliminarily installed in the control section 1. The control section 1 displays a three-dimensional image rendered from the tomographic images on the basis of the three-dimensional image rendering program. The three-dimensional image may be an image rendered by the surface rendering method or an image rendered by the volume rendering method. Alternatively, the three-dimensional image may be based on data prepared by a pseudo projection method.

Then, the control section 1 judges whether the device is in a three-dimensional point inputting mode (Step S2). Where a three-dimensional point inputting operation is to be performed, the device is set in this mode. If the device is not in the three-dimensional point inputting mode, the control section 1 performs any of other processing operations (Step S18).

In the three-dimensional point inputting mode, the user manipulates the three-dimensional image 8 displayed on the display screen 7 of the display device 3 into a desired orientation (first orientation). According to the manipulation, the control section 1 displays the three-dimensional image 8 in the orientation desired by the user on the display screen 7 of the display device 3 (Step S3).

The orientation desired by the user is such that the user can view the point desired to be designated on the three-dimensional image. Since the user cannot view the desired point depending on the orientation of the three-dimensional image, the three-dimensional image is rotated and displayed in such an orientation as to permit the user to view the desired point. Therefore, the user can designate the desired point while viewing the three-dimensional image.

The user designates a point on the three-dimensional image 8 displayed on the display screen 7. As described above, the designation of the point can be achieved by placing the cursor on the to-be-designated point by the mouse or the like.

If the control section 1 judges that the first designation point is inputted (Step S4), the control section 1 creates a plane passing through the inputted point parallel to a view axis orthogonally to the display screen 7 (the plane orthogonal to the display screen 7 herein means a vertical or horizontal section with respect to the display screen 7), and stores the plane in the memory 2 (Step S5).

Then, an instruction for prompting the user to input a second designation point is displayed on the display device 3. In response to the instruction, the user manipulates the image displayed on the display screen 7 into an orientation different from the first orientation. The three-dimensional image 8 is displayed in the second orientation on the display screen 7 according to the manipulation (Step S6).

The user inputs the second designation point while viewing the point on the three-dimensional image displayed in the second orientation. Thus, the control section 1 judges that the second designation point is inputted (Step S7), and creates and stores a straight line passing through the inputted designation point parallel to a view axis (a straight line orthogonal to the display screen 7) (Step S8).

Then, the coordinates of an intersection between the plane (section) created in Step S5 and the straight line created in Step S7 are calculated (Step S8). The coordinates of the intersection are stored as a pick point in the memory, and the point represented by the intersection coordinates is displayed on the three-dimensional image 8 on the display screen 7 (Step S9).

An example of the display is shown in FIG. 5 described above. The pick point may be displayed together with the plane created in Step S5 and the straight line created in Step S8 or, alternatively, the display of the plane and the straight line may be obviated.

If the displayed pick point is located at a position different from the desired point, the user can input a command for canceling the pick point (Step S10). If the canceling command is inputted, the control section 1 cancels the points specified in Steps S4, S7 and S9 (Step S11), and the process returns to Step S3.

If the pick point represented by the intersection coordinates is the point desired by the user, the user is permitted to change the shape, size and color of a mark denoting the pick point.

Where the user desires to change the shape, size and color of the mark of the pick point, the user inputs a command for changing the mark from the operation section 4 and, in response thereto, the control section 1 performs a mark changing operation (Step S13).

Where the mark of the pick point displayed on the three-dimensional image makes the three-dimensional image less visible depending on a positional relationship between the mark and the displayed three-dimensional image, the mark of the pick point is not necessarily required to be displayed on the three-dimensional image. In this case, an icon for easily specifying the pick point when the user desires to re-display the designated pick point or to extract a region around the pick point and display the region on a greater scale, for example, may be displayed in a peripheral region (outside an image display region) of the display screen. Where the user desires to re-display the pick point once designated, to extract the region around the pick point and display the region on a greater scale, or to form a tomographic image involving the pick point, the existing pick point can be selected by clicking the icon displayed in the peripheral region of the display screen rather than by re-designating the pick point on the three-dimensional image. Thus, the operation is simplified.

Further, a CT level at the pick point can be displayed (Step S14). (A CT image is represented by levels of X-ray reflected on an organ of an irradiated human body as relative X-ray absorption levels. That is, the relative X-ray absorption levels are determined with respect to an X-ray absorption level of water of zero. For example, the relative X-ray absorption levels are about 80 to about 1000 for bones and calcified substances, and about 20 to about 70 for blood and liver. A judgment can be made, for example, on the degree of calcification of a bone and the presence or absence of a tumor in liver on the basis of the CT level at the pick point.) Where the user desires to display the CT level, the user operates the operation section 4 and, in response thereto, the CT level is displayed in the vicinity of the pick point (Step S15). The CT level may be displayed in a special display region such as located in a corner of the display screen 7 rather than in the vicinity of the pick point.

Further, the user can extract a region, for example, having a predetermined radius about the specified pick point. Upon detection of the extraction, the control section 1 performs a necessary extracting operation (Step S17), and displays the extracted region on a greater scale.

The embodiment described above is directed to a case where the plane orthogonal to the display screen is created when the three-dimensional image is displayed in the first orientation and the straight line orthogonal to the display screen is created when the three-dimensional image is displayed in the second orientation. However, the specification of the pick point may be achieved by creating two planes orthogonal to the display screen (e.g., two planes orthogonal to the display screen and respectively extending vertically and horizontally) when the three-dimensional image is displayed in the first orientation, then creating one plane orthogonal to the display screen when the three-dimensional image is displayed in the second orientation, and determining an intersection between these three planes.

Alternatively, the creation of the straight line may precede the creation of the plane, which is followed by the determination of the intersection between the straight line and the plane for the specification of the pick point.

What is important is that the arbitrary points are respectively designated on the three-dimensional image when the three-dimensional image is viewed along the two different view axes, then the plane(s) or the straight line passing through the designated points orthogonally to the display screen are created, and the intersection is determined to specify the pick point.

In the embodiment described above, the image to be displayed on the display screen is a three-dimensionally rendered image, but not limited thereto. The image to be displayed on the display screen may be an image three-dimensionally displayed through projection in an arbitrary direction by Max-IP, Min-IP, Raysum or a like method.

In some cases, images three-dimensionally displayed through projection in an arbitrary direction by a display method such as MIP (maximum intensity projection) or Laysum are employed. An image obtained by this display method is displayed like an ordinary X-ray photograph, but has three-dimensional information. Therefore, it is possible to create and display a projection image as required while rotating the image in an arbitrary direction. The present invention is also applicable to an image obtained by such a display method. A more specific explanation will be given to this method with reference to FIG. 12. When a point is designated on an image displayed through projection in a single direction, a plane passing through this point orthogonally to the display screen is created. The created plane is displayed as a straight line on the projection image. The plane orthogonal to the display screen is projected along a view axis and, therefore, displayed as a straight line on the image. However, three-dimensional information is retained in the control section 1 (computer).

Figure 12:
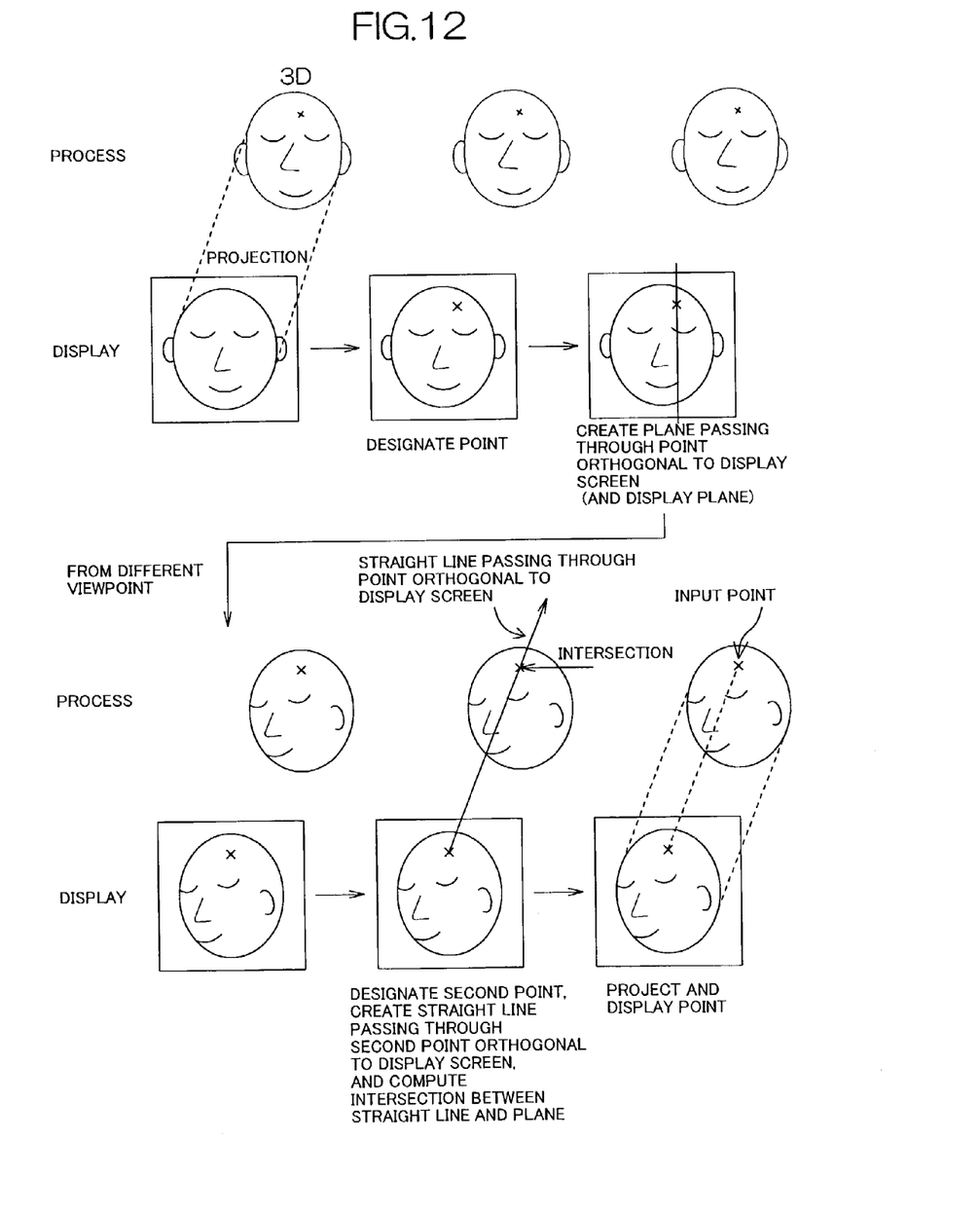
FIG. 12 is an explanatory diagram illustrating a point designating process to be performed on an image three-dimensionally displayed by projection in an arbitrary direction.

Then, an image obtained through projection in another direction is displayed. That is, an image projected along a different view axis is displayed. At this time, the plane created on the basis of the previously designated point is not displayed as the straight line but as a plane. Then, a second point is designated from this viewpoint. The control section 1 calculates three-dimensional coordinates of an intersection between the previously created plane and a line passing through the second point orthogonally to the display screen, and retains the coordinates of the intersection as the pick point. Further, the pick point can be displayed on the image.

As described above, the present invention is also applicable to point input on a medical image three-dimensionally displayed through projection in an arbitrary direction.

In accordance with further another embodiment of the present invention, an arbitrary point can be designated on a medical three-dimensional image in the following manner.

A three-dimensional image or a three-dimensional projection image displayed on the display screen is controlled in a first arbitrary orientation according to an operation of the user. When an arbitrary point is designated on the three-dimensional image or the three-dimensional projection image displayed in the first orientation on the display screen, a sectional image passing through the point orthogonally to the display screen is created. Then, the sectional image thus created is displayed on the display screen.

The user designates an arbitrary point on the displayed sectional image. Since the designated point is present on the sectional image, the control section 1 calculates the three-dimensional coordinates of the point and retains the coordinates. Thus, the arbitrary point on the three-dimensional image can be specified.

In this embodiment, after the arbitrary point is displayed on the three-dimensional image or the three-dimensional projection image displayed in the first orientation, the plane orthogonal to the display screen, i.e., the sectional image, is created and displayed. Thus, the point can be designated directly on the sectional image for the point designation on the image displayed in the second orientation (perpendicular to the section). Thus, the point designation can be achieved even if the point is located in an overlapped or hindered relationship with respect to the displayed three-dimensional image.

This method permits the direct point designation on the three-dimensionally displayed image, so that three-dimensional positioning can easily be achieved as compared with the conventional point input on the two-dimensional image. Further, there is no need for switching between the three-dimensional image and the two-dimensional image for every operation. Since the conditions for the creation of the sectional image are specified such that the sectional image passes through the point designated on the basis of the first orientation orthogonally to the display screen, the sectional image orthogonal to the display screen can automatically be created simply by designating the single point on the basis of the first orientation without the conventional complicated setting of positions and orientations for the creation of the sectional image. Thus, the creation of the section can easily be achieved.

The present invention is not limited to the embodiments described above, but various modifications may be made within the scope of the invention as set forth in the claims.

This application claims priority benefits under the Convention on the basis of Japanese Patent Application No. 2000-182069 filed with the Japanese Patent Office on Jun. 16, 2000, the disclosure thereof being incorporated herein by reference.

The invention claimed is:

1. A point inputting device for a three-dimensional image for use in the field of medical imaging; the device comprising:
   display means for displaying the three-dimensional image on a display screen;
   display controlling means for controlling an orientation of the three-dimensional image displayed on the display screen into a desired orientation;
   means operative in response to designation of an arbitrary point on the three-dimensional image displayed in a first orientation on the display screen for creating a plane passing through this point orthogonally to the display screen;
   means operative in response to designation of an arbitrary point on the three-dimensional image displayed in a second orientation different from the first orientation on the display screen for creating a straight line passing through this point orthogonally to the display surface; and
   means for determining coordinates of an intersection between the created plane and the created straight line, and retaining the intersection as a pick point.

2. The three-dimensional image point inputting device as set forth in claim 1, further comprising pick point associated processing means for displaying the pick point on the three-dimensional image, displaying a data value of the pick point, or extracting a region around the pick point.

3. The device as set forth in claim 1, wherein the display screen is stationary.

4. A three-dimensional image arbitrary point inputting method for use in the field of medical imaging, the method being for designating an arbitrary point on a three-dimensional image displayed on a display screen; the method comprising the steps of:
   controlling an orientation of the three-dimensional image displayed on the display screen into a first orientation according to an operation of a user and, in response to designation of an arbitrary point on the three-dimensional image displayed in the first orientation on the display screen by the user, creating a plane passing through this point orthogonally to the display screen;
   controlling the orientation of the three-dimensional image displayed on the display screen into a second orientation different from the first orientation according to an operation of the user;
   in response to designation of an arbitrary point on the three-dimensional image displayed in the second orientation on the display screen by the user, creating a straight line passing through this point orthogonally to the display screen; and
   determining coordinates of an intersection between the created plane and the created straight line and retaining the intersection as a pick point.

5. The method as set forth in claim 4, wherein the display screen is stationary.

6. A point inputting device for a three-dimensional image for use in the field of medical imaging, the device comprising:
   display means for displaying the three-dimensional image on a display screen;
   display controlling means for controlling an orientation of the three-dimensional image displayed on the display screen into a desired orientation;
   means operative in response to designation of an arbitrary point on the three-dimensional image displayed in a first orientation on the display screen, creating two planes each passing through this point orthogonally to the display screen;
   means operative in response to designation of an arbitrary point on the three-dimensional image displayed in a second orientation different from the first orientation on the display screen, creating one plane passing through this point orthogonally to the display screen; and
   means for determining coordinates of an intersection between the stored three planes, and retaining the intersection as a pick point.

7. The device as set forth in claim 6, wherein the display screen is stationary.

8. A three-dimensional image arbitrary point inputting method for use in the field of medical imaging, the method designating an arbitrary point on a three-dimensional image displayed on a display screen; the method comprising the steps of:
   (1) controlling an orientation of the three-dimensional image displayed on the display screen into a first orientation according to an operation of a user and, in response to designation of an arbitrary point on the three-dimensional image displayed in the first orientation on the display screen by the user, creating two planes or one straight line passing through this point orthogonally to the display screen;
   (2) controlling the orientation of the three-dimensional image displayed on the display screen into a second orientation different from the first orientation according to an operation of the user and, in response to designation of an arbitrary point on the three-dimensional image displayed in the second orientation on the display screen by the user, creating one plane passing through this point orthogonally to the display screen;
   (3) determining coordinates of an intersection between the three planes including the two planes created in the step (1) and the one plane created in the step (2) or determining coordinates of an intersection between the straight line created in the step (1) and the one plane created in the step (2); and (4) retaining the intersection represented by the determined coordinates as a pick point.

9. The three-dimensional image arbitrary point inputting method as set forth in claim 8, wherein the step (2) precedes the step (1).

10. The method as set forth in claim 8, wherein the display screen is stationary.

11. A program for use in the field of medical imaging, the program being for designating an arbitrary point on a three-dimensional image displayed on a display screen; the program performing the steps of:

(1) controlling an orientation of the three-dimensional image displayed on the display screen into a first orientation according to an operation of a user and, in response to designation of an arbitrary point on the three-dimensional image displayed in the first orientation on the display screen by the user, creating two planes or one straight line passing through this point orthogonally to the display screen;

(2) controlling the orientation of the three-dimensional image displayed on the display screen into a second orientation different from the first orientation according to an operation of the user and, in response to designation of an arbitrary point on the three-dimensional image displayed in the second orientation on the display screen by the user, creating one plane passing through this point orthogonally to the display screen;

(3) determining coordinates of an intersection between the three planes including the two planes created in the step (1) and the one plane created in the step (2) or determining coordinates of an intersection between the straight line created in the step (1) and the one plane created in the step (2); and (4) retaining the intersection represented by the determined coordinates as a pick point.

12. The program as set forth in claim 11, wherein the display screen is stationary.

* * * * *